(12) United States Patent
Lindskog et al.

(10) Patent No.: US 7,366,756 B2
(45) Date of Patent: Apr. 29, 2008

(54) SYSTEM AND METHOD FOR SECURING PRIVACY OF CHAT PARTICIPANTS

(75) Inventors: Helena Lindskog, Karlstad (SE); Mikael Nilsson, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1167 days.

(21) Appl. No.: 09/901,332

(22) Filed: Jul. 9, 2001

(65) Prior Publication Data

US 2003/0009523 A1    Jan. 9, 2003

(51) Int. Cl.
*G06F 15/16* (2006.01)

(52) U.S. Cl. ...................... 709/205; 709/207

(58) Field of Classification Search ........ 709/203–206, 709/216–219, 226, 230, 237, 246; 707/507–508
See application file for complete search history.

(56) References Cited

U.S. PATENT DOCUMENTS

| | | | | |
|---|---|---|---|---|
| 5,907,677 | A |  5/1999 | Glenn et al. ........... 395/200.36 |
| 6,253,248 | B1 * | 6/2001 | Nakai et al. ................. 709/237 |
| 6,330,601 | B1 * | 12/2001 | French et al. ............... 709/223 |
| 6,473,802 | B2 * | 10/2002 | Masters ...................... 709/229 |
| 6,687,732 | B1 * | 2/2004 | Bector et al. ............... 709/200 |
| 6,687,739 | B2 * | 2/2004 | Anupam et al. ............ 709/204 |

FOREIGN PATENT DOCUMENTS

| EP | 107258 | 2/2002 |
|---|---|---|
| WO | WO 01/02981 A2 | 1/2001 |

OTHER PUBLICATIONS

ACM 0001-082/81/0200-0048 Feb. 1981 US David Chaum.*
David Chum, Communication of the ACM, Feb. 1981, vol. 24, No. 2.*
David Chaum, "Untraceable Electronic Mail, Return Addresses, and Digital Pseudonyms", *Communications of the ACM*, Feb. 1981, Vol. 24, No. 2, pp. 1-8.

* cited by examiner

*Primary Examiner*—Jason Cardone
*Assistant Examiner*—Mtira Kianersi
(74) *Attorney, Agent, or Firm*—Roger S. Burleigh

(57) ABSTRACT

The present invention discloses a system and method for providing privacy to a client accessing a chat application on a chat server via the Internet wherein a request is transmitted for a chat application from a client to a first proxy server. The request is forwarded from the first proxy server to a second proxy server. In response to the receipt of the request at the second proxy server, a unique ID is forwarded back to the first proxy server and the request along with the unique ID are forwarded on to the chat server. A response to the request is transmitted from the chat server back to the second proxy server along with the originally provided unique ID. The response and unique ID are stored within the second proxy server and may be accessed form the first proxy server by providing the unique ID.

20 Claims, 2 Drawing Sheets

SYSTEM AND METHOD FOR SECURING PRIVACY OF CHAT PARTICIPANTS

TECHNICAL FIELD

The present invention relates to the use of chat applications on the Internet, and more particularly, to a method for securing privacy for chat participants from a service operator providing chat services.

BACKGROUND OF THE INVENTION

Chat services on the Internet provide for real time communication between two users via a computer, wireless device, or any other text based communication apparatus. Once a chat has been initiated, either user may enter text by typing on an interface, and the entered text will appear upon the other user's display. Most networks and online services offer some type of chat feature. One type of chat application, ICQ, comprises an easy-to-use online instant messaging program. ICQ is used as a mostly PC-based conferencing tool by individuals to chat, e-mail, perform file transfers, play computer games and many other applications. ICQ enables a user to create a list of friends, family, and business associates who also have ICQ on their computer or mobile communications device. ICQ uses this list to find other friends for a user and notifies the user when people on their list have signed on to the Internet.

Another example of a chat application comprises Internet relay chat (IRC). IRC has become more popular as more individuals become connected to the Internet because it enables people connected anywhere on the Internet to join in live discussions. Also, unlike older chat systems, IRC is not limited to just two participants. An IRC client on a user computer or mobile communications device sends and receives messages to an IRC server located on the Internet. The IRC server is responsible for making sure that all messages are broadcast to everyone participating in the discussion.

Another type of chat application includes instant messaging enabling a user to create a private chat room with another individual. The instant messaging system normally alerts a user whenever somebody on their private list is on-line. Their application may create a chat session with that particular individual. There is presently no standard for instant messaging so both parties must be utilizing the same instant messaging system.

The development of the wireless application protocol (WAP) has enabled users to obtain access to the Internet in a mobile fashion via mobile telephones, pagers, portable computers and many other types of mobile computing devices. Also, the ability to position individuals accessing the Internet via mobile devices has also greatly increased. While in some circumstances a user may desire for individuals to localize their position, there are many circumstances in which a user may not want, for example, a chat application service provider, to be able to position the user and provide the user with unwanted information and/or advertising based upon the user's current position. Many users desire a degree of privacy with respect to their positioning and would like to keep this information from the chat service provider.

SUMMARY OF THE INVENTION

The present invention overcomes the foregoing and other problems with a system and method wherein a client transmits a request for a chat application to a first proxy server. The request, encrypted by the public key of a second proxy server and a public key of a chat server, is then transmitted from the first proxy server to the second proxy server. In response to receipt of the request at the second proxy server, a unique ID is transmitted back to the first proxy server, and the request is transmitted to the chat server along with the same unique ID. The transmission from the second proxy server to the chat server is encrypted using only the public key of the chat server. A response, including the unique ID, and encrypted using the private key of the second proxy server and the private key of the first proxy server is transmitted from the chat server back to the second proxy server The response is stored at the second proxy server along with the unique ID. The response is accessed by the provision of the unique ID from the first proxy server.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
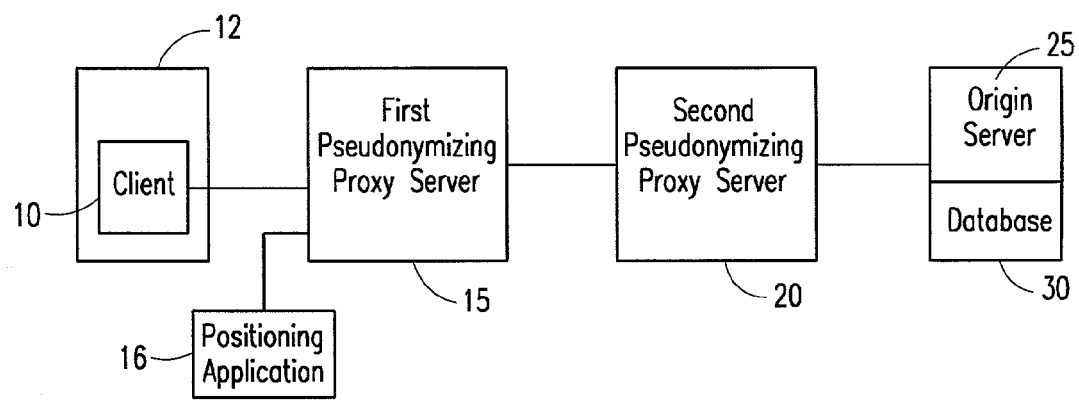
FIG. 1 is a block diagram of a system utilizing the method of the present invention.

Referring now to the drawings, and more particularly to FIG. 1, there is illustrated a block diagram of a system for accessing a chat application according to the method of the present invention. The client 10 is included within a device 12 such as a mobile telephone, portable computer, pager, personal data assistant, or other type of device capable of wirelessly accessing the Internet and communicating using a chat application. The client 10 accesses a first pseudonymizing proxy server 15 as will be more fully described with respect to FIG. 2. The first pseudonymizing proxy server 15 may be provided by a system operator and is responsible for retrieving the position of the client 10 from the appropriate application 16. The first pseudonymizing proxy server 15 may also be a personal proxy located within an Intranet associated with the client 10 or even located within the device 12 containing the client 10. The first pseudonymizing proxy server 15 must be a trusted entity and has a public and a private key.

A second pseudonymizing proxy server 20 is an anonymizer server located somewhere within the Internet. It is trusted that the second pseudonymizing proxy server 20 does not cooperate in any fashion with the origin server 25. The second pseudonymizing proxy server 20 has a public key and a private key.

The origin server 25 is responsible for providing chat services to the client 10. Examples of these include a sign-up service enabling the client 10 to sign up for a particular service, an "add user" option which requests the addition of a particular user to a user list, a "view list" option enabling a user to see all users upon an accepted list, a "find pals" request enabling the display of a list of friends and their respective positions, an "enter invisible" option enabling a user to anonymously enter a chat with their position being erased, an "enter visible" mode where the user's position is periodically sent to the origin server 25 and an "alert" request which periodically provides a particular client's position. A database 30 associated with the origin server 25 stores a user's number, a pseudo identity, a latest position of a user with a timestamp, and a list of related users to a user (i.e., their buddy list). None of the users are known to the origin server 25, but they are known to each other. Thus, by using a unique pseudo identity that is transmitted via other channel to friends, the secret may not be perfectly safe, but safe enough for most users and scenarios.

Figure 2:
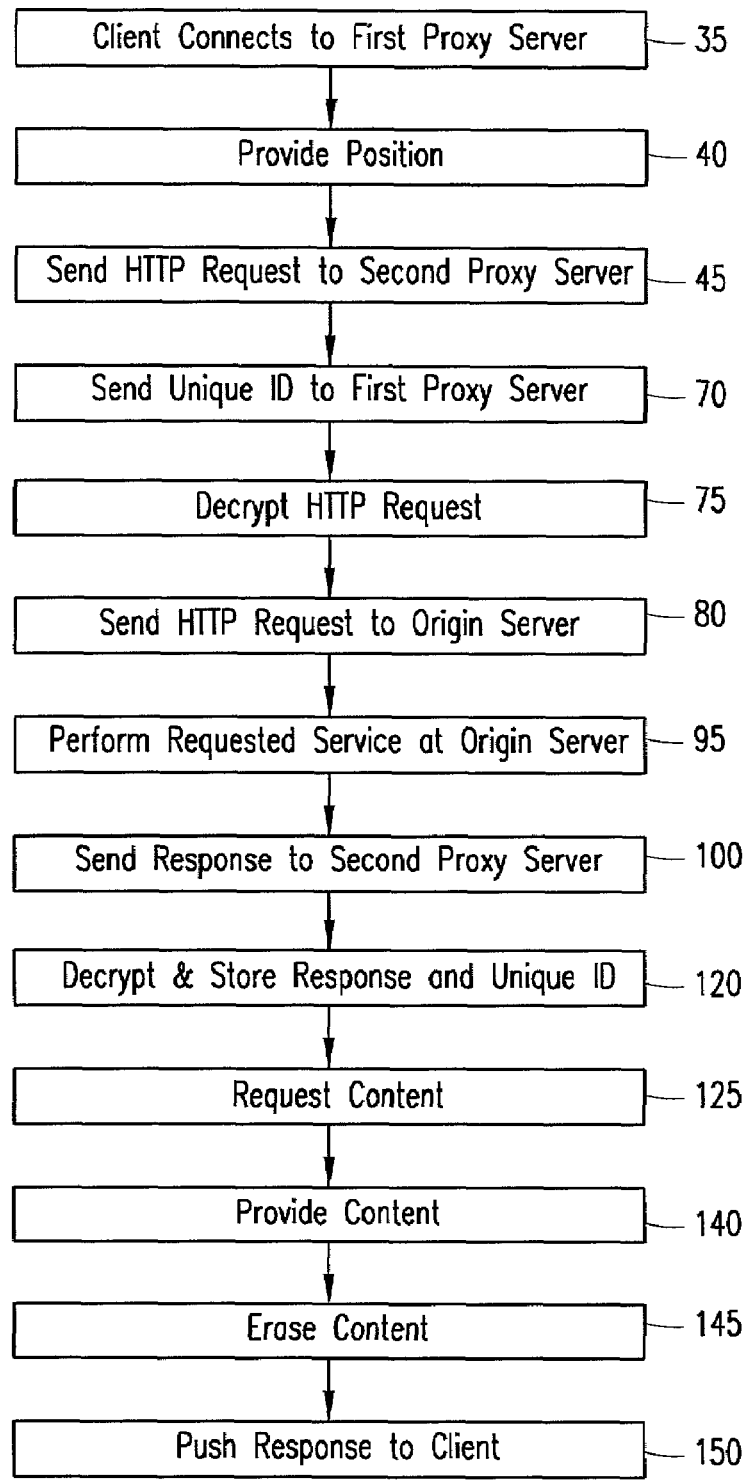
FIG. 2 is a flow diagram describing a method for providing privacy to a user of a chat application.

Referring now to FIG. 2, there is a flow diagram illustrating a method for ensuring privacy of a client's position if desired. The client 10 connects at step 35 to the first pseudonymizing proxy server 15 to request a chat service. The client 10 may, in one embodiment, connect with the first pseudonymizing proxy server 15 via a WAP gateway, not shown, or similar type of gateway connection depending upon the location of the first pseudonymizing proxy server 15. The client 10 also provides the position of the client at step 40 to the first proxy server 15, using, for example, base station position techniques such a mobile positioning system (MPS), GPS, or other positioning technology.

Figure 3:
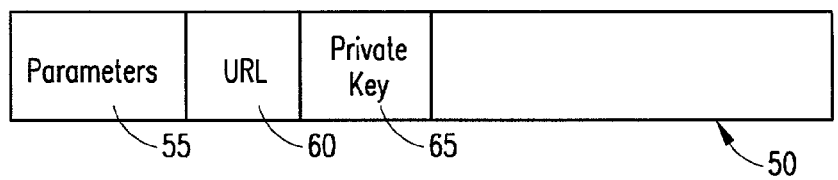
FIG. 3 is an illustration of the request transmitted from a first proxy server to a second proxy server.

The first proxy server 15 transmits at step 45 an HTTP request relating to a chat application to the second pseudonymizing proxy server 20. Referring now also to FIG. 3, there is illustrated an example of the HTTP request 50. The request 50 contains the parameters 55 necessary for providing a particular chat service requested by the client 10. The parameters 55 are encrypted with the public key of the origin server 25. The request 50 also includes the URL 60 of the requested chat service at the origin server 25 and the private key 65 of the first pseudonymizing proxy server 15. All of this data (the encrypted parameters, the URL and the private key) are encrypted with the public key of the second pseudonymizing proxy server 20 and transmitted to the second proxy server 20 at step 45.

Figure 4:
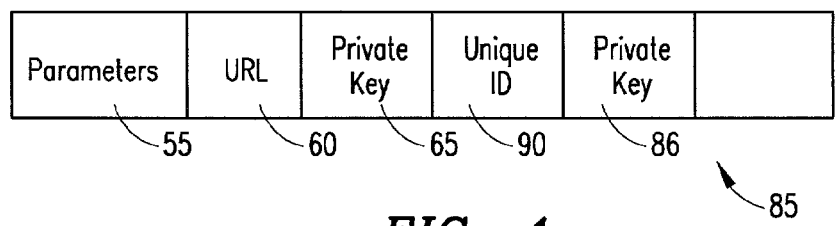
FIG. 4 illustrates the request transmitted from the second proxy server to the origin server.

In response to receipt of the HTTP request 50, the second pseudonymizing proxy server 20 sends a unique ID to the first pseudonymizing proxy server 15 at step 70 and decrypts the received HTTP request 50 at step 75. The second pseudonymizing proxy server 20 transmits the decrypted HTTP request to the origin server at step 80. Referring now also to FIG. 4, there is illustrated the partially decrypted HTTP request 85 transmitted from the second pseudonymizing proxy server 20 to the origin server 25. The HTTP request 85 includes the originally provided encrypted parameters 55, the URL 60 and the private key 65 of the first pseudonymizing proxy server 15. Also included within the request 85 is the unique ID 90 that was provided to the first pseudonymizing proxy server 15 and the private key 86 of the second proxy server 20. The parameters 55, URL 60, unique ID 90 and first pseudonymizing proxy server private key 65 are each still encrypted using the origin server's public key. The added unique ID 90 and private key 86 of the second proxy server 20 are also encrypted with the origin server's 25 public key.

Figure 5:
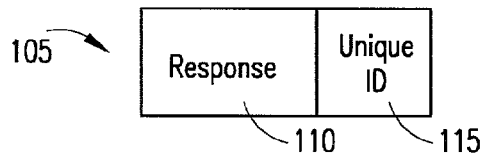
FIG. 5 illustrates a response transmitted between the origin server and the second proxy server.
Figure 6:
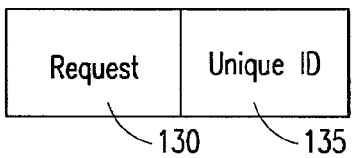
FIG. 6 illustrates a request transmitted between the first proxy server and the second proxy server including a unique ID.

The origin server performs at step 95 the requested action and transmits a response 110 at step 100 back to the second pseudonymizing proxy server 20. As illustrated in FIG. 5, the message 105 transmitted from the origin server 25 includes the response 110 and the unique ID 115. The message 105 is first encrypted by the first pseudonymizing proxy server's 15 private key and by the second pseudonymizing proxy server's 20 private key. The second proxy server 20 decrypts the message 105 at step 120 using both of the private keys and stores the response along with the unique ID. The first pseudonymizing proxy server 15 requests the information contained within the response at step 125 by providing the unique ID originally provided to the first pseudonymizing proxy server 15 by the second pseudonymizing proxy server 20 at step 70. The request 130 (FIG. 6) includes the unique ID 135. The content is then provided to the first pseudonymizing proxy server at step 140 responsive to the unique ID 135, and the information associated with the unique ID is erased at step 145 at the second proxy server 20. The provided content may be pushed to the client at step 150, if relevant.

The previous description is of a preferred embodiment for implementing the invention, and the scope of the invention should not necessarily be limited by this description. The scope of the present invention is instead defined by the following claims.

What is claimed is:

1. A method for providing privacy to a client accessing a chat application on a chat server, comprising the steps of:
   transmitting a request for the chat application from the client to a first proxy server;
   transmitting the request for the chat application from the first proxy server to a second proxy server;
   providing a unique ID to the first proxy server from the second proxy server responsive to the request;
   transmitting the request for the chat application and the unique ID from the second proxy server to the chat server;
   transmitting a response and the unique ID from the chat server to the second proxy server responsive to the request;
   storing the response at the second proxy server with the unique ID; and
   accessing the stored response from the first proxy server by providing the unique ID.

2. The method of claim 1, further comprising the step of erasing the stored response and the unique ID in the second proxy server responsive to an access by the first proxy server.

3. The method of claim 1, further comprising the step of pushing the response from the first proxy server to the client.

4. The method of claim 1, further comprising the step of providing a position of the client to the first proxy server.

5. The method of claim 1, further including the step of encrypting transmissions from the first proxy server to the second proxy server using both a first public key of the chat server and a second public key of the second proxy server.

6. The method of claim 5, further including the step of encrypting transmissions from the second proxy server to the chat server using the first public key of the chat server.

7. The method of claim 5, further including the step of encrypting transmissions from the chat server to the second proxy server using both a first private key of the first proxy server and a second private key of the second proxy server.

8. A method for providing privacy to a client accessing a chat application on a chat server, comprising the steps of:
   transmitting a request for the chat application from the client to a first proxy server;
   encrypting transmissions from the first proxy server to the second proxy server using both a first public key of the chat application server and a second public key of a second proxy server;

transmitting the request for the chat application from the first proxy server to a second proxy server;

providing a unique ID to the first proxy server from the second proxy server responsive to the request;

encrypting transmissions from the second proxy server to the chat server using the first public key of the chat server;

transmitting the request for the chat application and the unique ID from the second proxy server to the chat application server;

encrypting transmissions from the chat server to the second proxy server using both a first private key of the first proxy server and the second private key of the second proxy server;

transmitting a response and the unique ID from the chat server to the second proxy server responsive to the request;

storing the response at the second proxy server with the unique ID;

accessing the stored response from the first proxy server by providing the unique ID; and erasing the stored response and the unique ID in the second proxy server responsive to the access.

9. The method of claim 8, further comprising the step of pushing the response from the first proxy server to the client.

10. The method of claim 8, further comprising the step of providing a position of the client to the first proxy.

11. A system for protecting location data on a client accessing a client server comprising:

a first proxy server associated with the client;

a second proxy server located on the Internet;

wherein the first proxy server and the second proxy server are configured to:

receive a request for the chat application from the client at the first proxy server transmit the request for the chat application from the first proxy server to the second proxy server;

provide a unique ID to the first proxy server from the second proxy server responsive to the request;

transmit the request for the chat application and the unique ID from the second proxy server to the chat server;

receive a response and the unique ID from the chat server at the second proxy server;

store the response at the second proxy server with the unique ID; and access the stored response from the first proxy server by providing the unique ID to the second proxy server.

12. The system of claim 11, wherein the first and second proxy servers are further configured to erase the stored response and the unique ID in the second proxy server responsive to an access by the first proxy server.

13. The system of claim 11, wherein the first and second proxy servers are further configured to push the response from the first proxy server to the client.

14. The system of claim 11, wherein the first and second proxy servers are further configured to determine a position of the client at the first proxy server.

15. The system of claim 11, wherein the first and second proxy servers are further configured to encrypt transmissions from the first proxy server to the second proxy server using both a first public key of the chat server and a second public key of the second proxy server.

16. The system of claim 11, wherein the first and second proxy servers are further configured to encrypt from the second proxy server to the chat server using the first public key of the chat server.

17. The system of claim 11, wherein the first and second proxy servers are further configured to decrypt transmissions from the client server at the second proxy server using both a first private key of the first proxy server and a second private key of the second proxy server.

18. The system of claim 11, wherein the first proxy server is located in an intranet associated with the client.

19. The system of claim 11, wherein the first proxy server is located within an apparatus containing the client.

20. The system of claim 11 wherein the second proxy server is accessible from the first proxy server via the Internet.

* * * * *